(12) United States Patent
Chuang et al.

(10) Patent No.: US 11,320,951 B1
(45) Date of Patent: May 3, 2022

(54) TRANSPARENT CONDUCTIVE ELECTRODE OF TOUCH PANEL

(71) Applicant: TPK Glass Solutions (Xiamen) Inc., Fujian (CN)

(72) Inventors: Chih Cheng Chuang, Zhubei (TW); Ya Ping Wang, Xiamen (CN); Tao Liu, Bijie (CN)

(73) Assignee: TPK Glass Solutions (Xiamen) Inc., Xiamen (CN)

( * ) Notice: Subject to any disclaimer, the term of this patent is extended or adjusted under 35 U.S.C. 154(b) by 0 days.

(21) Appl. No.: 17/089,053

(22) Filed: Nov. 4, 2020

(51) Int. Cl.
*G06F 3/044* (2006.01)

(52) U.S. Cl.
CPC .. *G06F 3/0446* (2019.05); *G06F 2203/04112* (2013.01)

(58) Field of Classification Search
CPC .............. G06F 3/0446; G06F 2203/04112
See application file for complete search history.

(56) References Cited

U.S. PATENT DOCUMENTS

2013/0015868 A1* 1/2013 Peng .............. G06F 3/0446
324/688

FOREIGN PATENT DOCUMENTS

| CN | 102929463 A | 2/2013 |
| TW | M483490 U | 8/2014 |
| TW | M608975 U | 3/2021 |

* cited by examiner

*Primary Examiner* — Towfiq Elahi
(74) *Attorney, Agent, or Firm* — Cooper Legal Group, LLC

(57) ABSTRACT

Transparent conductive electrodes of a touch panel including a plurality of first electrode patterns are provided. An edge of each of the first electrode patterns has a first outer etching line and a second outer etching line that are parallel to each other. A plurality of first inner etching lines are formed between any two of the adjacent first electrode patterns. A first distance is defined between each of the first outer etching lines and each of the second outer etching lines. A second distance is defined between each of the second outer etching lines and each of the first inner etching lines adjacent and parallel thereto. The first distance is less than the second distance, and the second distance is less than or equal to 15 times the first distance. The first distance is less than a distance between any two of the first inner etching lines.

8 Claims, 14 Drawing Sheets

TRANSPARENT CONDUCTIVE ELECTRODE OF TOUCH PANEL

FIELD OF THE DISCLOSURE

The present disclosure relates to transparent conductive electrodes of a touch panel, and more particularly to transparent conductive electrodes of a touch panel that has etching patterns between electrodes disposed adjacent to one another.

BACKGROUND OF THE DISCLOSURE

Touch panels are widely used in graphic display panels of televisions, mobile phones, mobile data terminals, and other optical display devices. Two common types of touch panels are resistive type and capacitive type.

A touch panel has a basic structure including transparent conductive electrodes disposed on an upper side and a lower side or on the same side of a substrate in different directions. The transparent conductive electrodes are formed through forming etching lines (i.e., grooves) on a layer of transparent conductive material (e.g., metal mesh, indium oxide) or silver nanowires, through laser etching, and filling transparent insulated material in the grooves. Contours of the transparent conductive electrodes are formed through a design of etching patterns, and the etching lines are utilized as insulation lines dividing the transparent conductive electrodes that are disposed adjacent to one another.

When the transparent conductive electrodes have high conductivity, mutual capacitance induction, and self-capacitance induction having sufficient sensitivity can be generated, so as to provide sufficient sensitivity of touch sensors. In addition, the contours of edges of the transparent conductive electrodes have a low visibility (i.e., the overall transparency of the transparent conductive electrodes is sufficiently high), such that the etching lines on the edges of the transparent conductive electrodes are not visible to the naked eye, thereby improving the overall visual effect of a screen. Therefore, during a process of manufacturing the transparent conductive electrodes, the transparent conductive electrodes are usually required to have high conductivity and low visibility.

However, conductivity and visibility of the transparent conductive electrodes are negatively correlated. When an amount (concentration or loading) of a conductive material or a thickness of a layer of a conductive material is increased for the purpose of increasing the conductivity (lowering the resistance), the etching lines (i.e., the grooves) among the transparent conductive electrodes are required to be widened and deepened, so as to prevent the conductive material of the adjacent transparent conductive electrodes from contacting and causing a short circuit. However, the widened and deepened etching lines (i.e., grooves) are more visible (i.e., the contours of the transparent conductive electrodes are more visible) and easily observed by the naked eye. Furthermore, in order to make the transparent conductive electrodes invisible to the naked eye, the amount (concentration or loading) of a conductive material or the thickness of a layer of a conductive material is required to be decreased, which contrarily makes the resistance of the transparent conductive electrodes too high to provide sufficient touch-sensing function.

The above-mentioned inadequacies are more obvious in large sized or extra-large sized products. Compared to medium or small sized products, large sized or extra-large sized products have a larger area and a longer length, and the transparent conductive electrodes that are applied thereto also have a longer length and a higher resistance. Therefore, simultaneously encompassing the conductivity and the visibility of the transparent conductive electrodes is more difficult.

Therefore, the technical problem to be solved by the present disclosure is providing the transparent conductive electrodes with better visibility (i.e., higher transparency to the naked eye) while maintaining sufficient conductivity of the transparent conductive electrodes through the arrangement and the design of the etching lines.

SUMMARY OF THE DISCLOSURE

In response to the above-referenced technical inadequacies, the present disclosure provides transparent conductive electrodes of a touch panel.

In one aspect, the present disclosure provides transparent conductive electrodes of a touch panel including a plurality of first electrode patterns. An edge of each of the first electrode patterns has a first outer etching line and a second outer etching line that are parallel to each other. A plurality of first inner etching lines are disposed between any two adjacent first electrode patterns of the first electrode patterns. A first distance is defined between each of the first outer etching lines and each of the second outer etching lines, a second distance is defined between each of the second outer etching lines and each of the first inner etching lines that is parallel and adjacent thereto, the second distance is greater than or equal to 1.5 times the first distance, and the second distance is less than or equal to 15 times the first distance.

In another aspect, the present disclosure provides transparent conductive electrodes of a touch panel including a plurality of first electrode patterns. An edge of each of the first electrode patterns has a first outer etching line and a second outer etching line that are parallel to each other. A plurality of first inner etching lines are disposed between any two adjacent first electrode patterns of the first electrode patterns. A distance between each of the first outer etching lines and each of the second outer etching lines is less than a distance between any two of the first inner etching lines.

One of the advantages of the present disclosure is that the transparent conductive electrodes of the touch panel can have an increased conductivity and a decreased visibility through the technical solution of: 1) an edge of each of the first electrode patterns having a first outer etching line and a second outer etching line that are parallel to each other, and a plurality of first inner etching lines disposed between any two of the adjacent first electrode patterns, 2) a first distance being defined between each of the first outer etching lines and each of the second outer etching lines, and a second distance being defined between each of the second outer etching lines and each of the first inner etching lines that is parallel and adjacent thereto, and 3) the second distance being greater than or equal to 1.5 times the first distance, and the second distance being less than or equal to 15 times the first distance.

Another one of the advantages of the present disclosure is that the transparent conductive electrodes of the touch panel can have an increased conductivity and a decreased visibility through the technical solution of: 1) an edge of each of the first electrode patterns having a first outer etching line and a second outer etching line that are parallel to each other, 2) a plurality of first inner etching lines disposed between any two of the adjacent first electrode patterns, and 3) a distance between each of the first outer etching lines and each of the second outer etching lines being less than a distance between any two of the first inner etching lines".

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
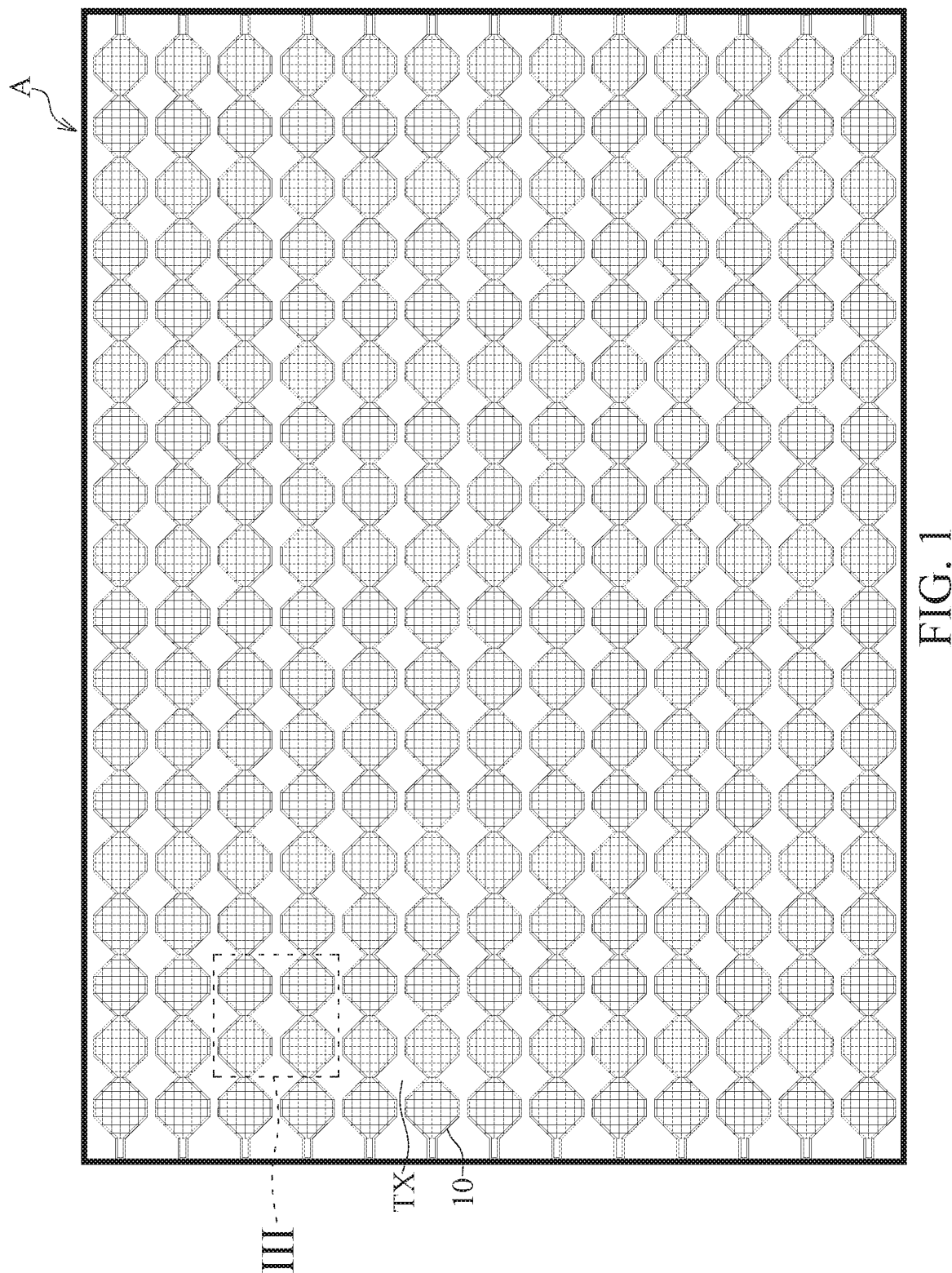
FIG. 1 is a schematic view of a transparent conductive electrode layer A in a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated upon or discussed herein. A recital of one or more synonyms does not exclude the use of other synonyms. The use of examples anywhere in this specification, including examples of any terms, is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals, or the like, which are for distinguishing one component/signal from another one only, and are not intended to, nor should be construed to impose any substantive limitations on the components, signals, or the like.

First Embodiment

Figure 2:
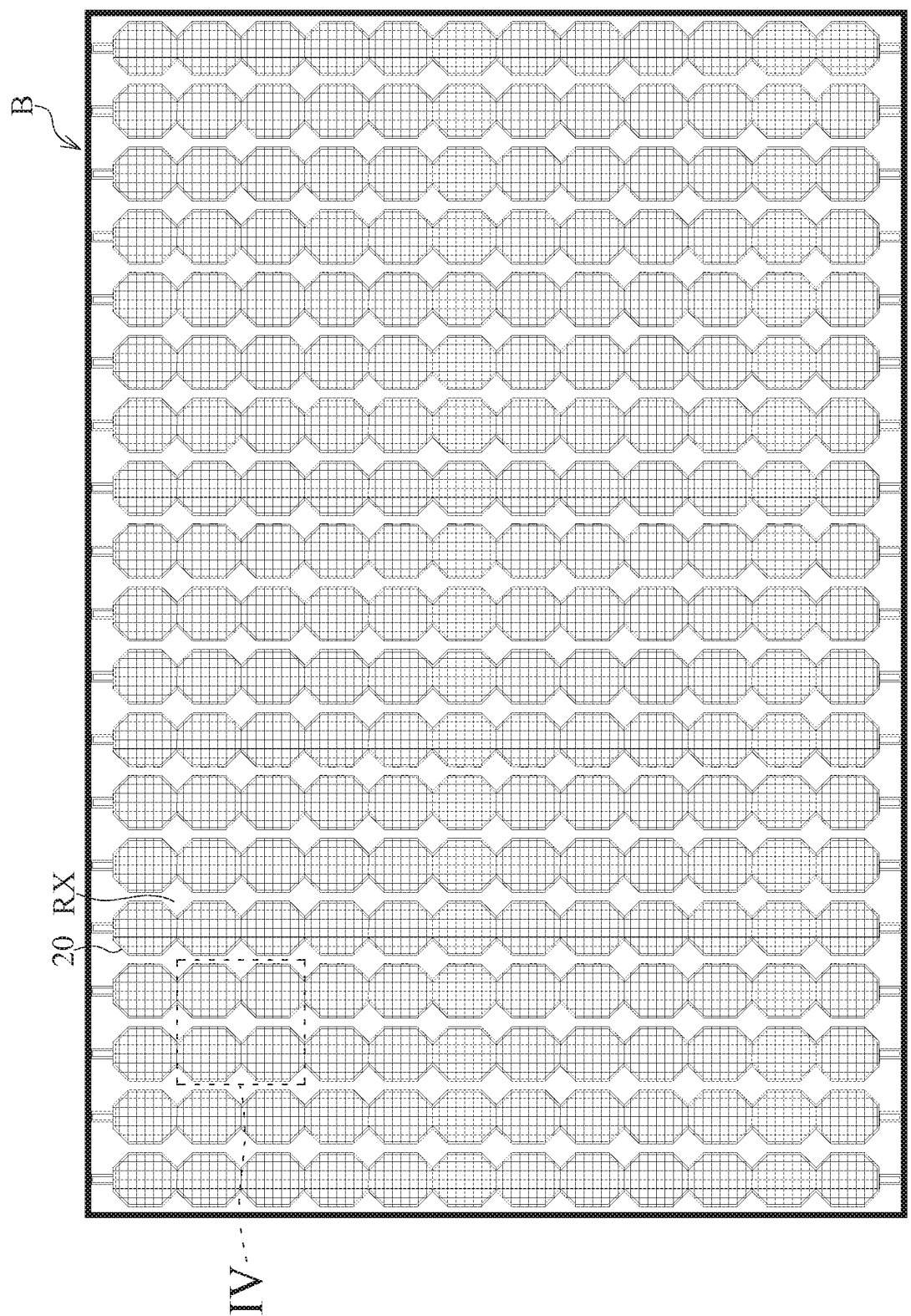
FIG. 2 is a schematic view of a transparent conductive electrode layer B in the first embodiment of the present disclosure.

References are made to FIG. 1 and FIG. 2, in which transparent conductive electrodes of a touch panel are provided in the present disclosure. FIG. 1 and FIG. 2 are schematic views of a transparent conductive electrode layer A and a transparent conductive electrode layer B in a first embodiment of the present disclosure, respectively. Both of the transparent conductive electrode layers A and B have mesh patterns that are formed by a plurality of extending lines and a plurality of line segments. A direction toward which the mesh patterns of the transparent conductive electrode layer A extend is perpendicular to a direction toward which the mesh patterns of the transparent conductive electrode layer B extend. When the touch panel is later manufactured through assembling of the transparent conductive electrode layers A and B, the transparent conductive electrode layers A and B are arranged to be stacked upon each other.

It is worth mentioning that, in the transparent conductive electrode layer A, the extending lines and the line segments are etching lines, the mesh patterns having the extending lines and the line segments are etching patterns, and the transparent conductive electrodes are configured as blank areas among the etching patterns. Similarly, in the transparent conductive electrode layer B, the extending lines and the line segments are etching lines, the mesh patterns having the extending lines and the line segments are etching patterns, and the transparent conductive electrodes are configured as blank areas among the etching patterns. In other words, the transparent conductive electrodes of the touch panel include a plurality of first electrode patterns TX that are arranged on the transparent conductive electrode layer A and a plurality of second electrode patterns RX that are arranged on the transparent conductive electrode layer B, and the second electrode patterns RX are perpendicular to the first electrode patterns TX.

Figure 3:
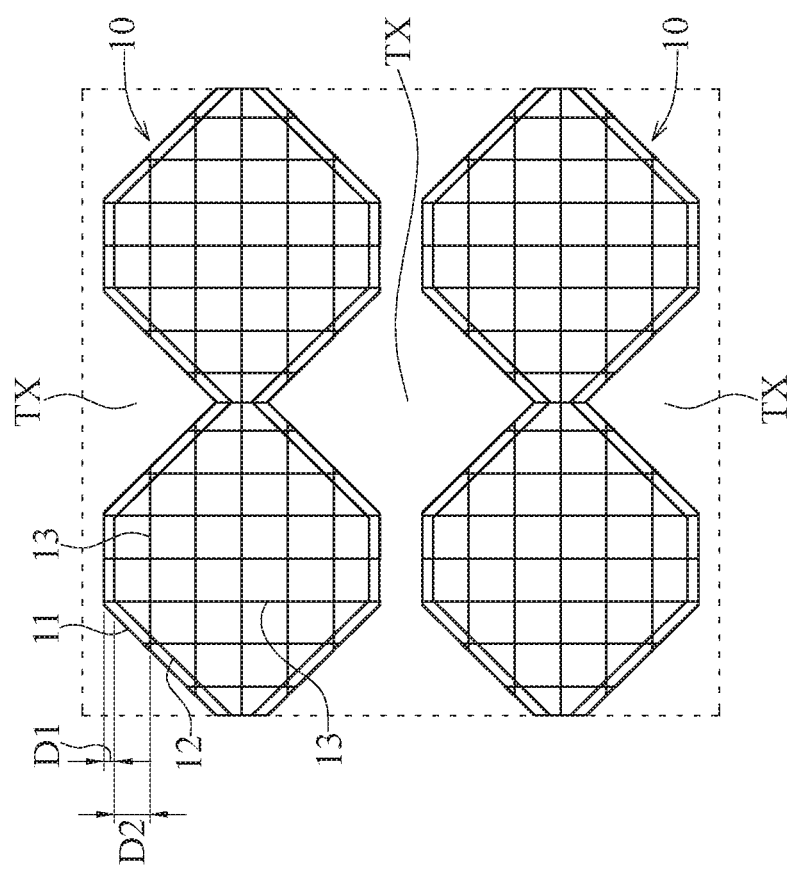
FIG. 3 is a schematic view of first electrode patterns in the first embodiment of the present disclosure.

Reference is made to FIG. 3, which shows an enlarged view of part III of FIG. 1. An edge of each of the first electrode patterns TX has a first outer etching line 11 and a second outer etching line 12 that extend in parallel to each other. More specifically, each of the first electrode patterns TX has two side edges, and each of the two side edges has the first outer etching line 11 and the second outer etching line 12 that extend in parallel to each other, such that the two side edges of the first electrode patterns TX have four of the outer etching lines in total (i.e., two of the first outer etching lines 11 that are adjacent to the first electrode patterns TX and two of the second outer etching lines 12 that are away from the first electrode patterns TX). It should be noted that the four outer etching lines do not intersect with one another, and each of the first electrode patterns TX extends continuously without being interrupted, given that the four outer etching lines extend continuously and do not intersect with one another.

A plurality of first inner etching lines 13 are disposed between two of the first electrode patterns TX adjacent to each other. Specifically, a first etching pattern 10 is formed between two of the first outer etching lines 11 of two of the first electrode patterns TX adjacent to each other, and the first etching pattern 10 includes the first inner etching lines 13. More specifically, the first etching pattern 10 is formed by the first outer etching line 11 and the second outer etching line 12 on the edge of one of the first electrode patterns TX and the first outer etching line 11 and the second outer etching line 12 on the edge of another one of the adjacent first electrode patterns TX. Therefore, the adjacent first outer etching lines 11 between two of the adjacent first electrode patterns TX form contours of the first etching pattern 10, and the first inner etching lines 13 form a pattern of the first etching pattern 10. As shown in FIG. 1, a mesh structure is formed through having the first inner etching lines 13 perpendicularly interlaced with one another. In other words, the first etching pattern 10 has a pattern that defines a perpendicularly-interlaced mesh structure.

Figure 4:
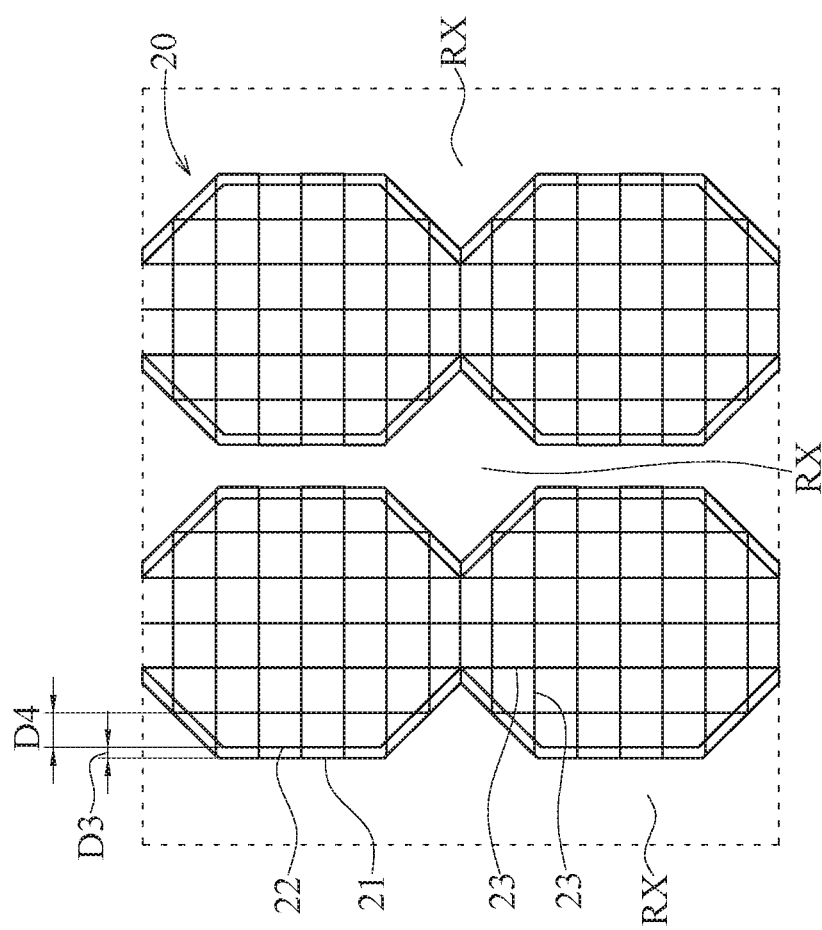
FIG. 4 is a schematic view of second electrode patterns in the first embodiment of the present disclosure.

Reference is made to FIG. 4, which shows an enlarged view of part IV of FIG. 2. An edge of each of the second electrode patterns RX has a third outer etching line 21 and a fourth outer etching line 22 that extend in parallel to each other. More specifically, each of the second electrode patterns RX has two side edges, and each of the two side edges has the third outer etching line 21 and the fourth outer etching line 22 that extend in parallel to each other, such that the two side edges of the second electrode patterns RX have four of the outer etching lines in total (i.e., two of the third outer etching lines 21 that are adjacent to the second electrode patterns RX and two of the fourth outer etching lines 22 that are away from the second electrode patterns RX). It should be noted that the four outer etching lines do not intersect with one another, and each of the second electrode patterns RX extends continuously without being interrupted, given that the four outer etching lines extend continuously and do not intersect with one another.

A plurality of second inner etching lines 23 are disposed between two of the second electrode patterns RC adjacent to each other. Specifically, a second etching pattern 20 is formed between two of the third outer etching lines 21 of the second electrode patterns RX adjacent to each other, and the second etching pattern 20 includes the second inner etching lines 23. More specifically, the second etching pattern 20 is formed by the third outer etching line 21 and the fourth outer etching line 22 on the edge of one of the second electrode patterns RX and the third outer etching line 21 and the fourth outer etching line 22 on the edge of another one of the adjacent second electrode patterns RX. Therefore, the adjacent third outer etching lines 21 between two of the adjacent second electrode patterns RX form contours of the second etching pattern 20, and the second inner etching lines 23 form a pattern of the second etching pattern 20. As shown in FIG. 2, a mesh structure is formed through having the second inner etching lines 23 perpendicularly interlaced with one another. In other words, the second etching pattern 20 has a pattern that defines a perpendicularly-interlaced mesh structure.

Furthermore, a first distance D1 is defined between each of the first outer etching lines 11 and each of the second outer etching lines 12, a second distance D2 is defined between each of the second outer etching lines 12 and each of the first inner etching lines 13 arranged adjacent and parallel thereto, the first distance D1 is less that the second distance D2, and the first distance D1 and the second distance D2 satisfy an equation of $1.5D1 \leq D2 \leq 15D1$. A third distance D3 is defined between each of the third outer etching lines 21 and each of the fourth outer etching lines 22, a fourth distance D4 is defined between each of the fourth outer etching lines 22 and each of the second inner etching lines 23 arranged adjacent and parallel thereto, the third distance D3 is less that the fourth distance D4, and the third distance D3 and the fourth distance D4 satisfy an equation of $1.5D3 \leq D4 \leq 15D3$.

In this embodiment, the first distance D1 and the third distance D3 are between 0.2 mm and 0.5 mm. Preferably, the first distance D1 and the third distance D3 are between 0.255 mm and 0.35 mm.

In this embodiment, the second distance D2 and the fourth distance D4 are between 0.3 mm and 3.0 mm.

In this embodiment, a width of each of the first outer etching lines 11, the second outer etching lines 12, the first inner etching lines 13, the third outer etching lines 21, the fourth outer etching lines 22, and the second inner etching lines 23 is between 25 μm and 65 μm. Preferably, the width of each of the first outer etching lines 11, the second outer etching lines 12, the first inner etching lines 13, the third outer etching lines 21, the fourth outer etching lines 22, and the second inner etching lines 23 is 35±3 μm.

In this embodiment, a visibility of the etching lines is decreased, indicating that the etching lines and the etching patterns are not easily observed by the naked eye. A sheet resistance of each of the first electrode patterns TX and the second electrode patterns RX is 30 ohms per square (Ω/sq), which is suitable for the specification range of touch sensing signals when the present disclosure is applied in medium-small sized panels (e.g., panels under 55 inches, measured diagonally) and large sized panels (e.g., panels over 55 inches, measured diagonally, specifically between 55-120 inches) of touch sensors.

Furthermore, in this embodiment, the etching lines can be manufactured through a photolithography process, a laser ablation process, and/or a laser etching process. Insulation lines that can divide the adjacent transparent conductive electrodes, which are manufactured through the laser ablation process or the laser etching process, can also be configured as the etching lines.

However, it should be noted that the above-mentioned examples are merely one of the possible implementations, and the present disclosure is not limited thereto.

Second Embodiment

Figure 5:
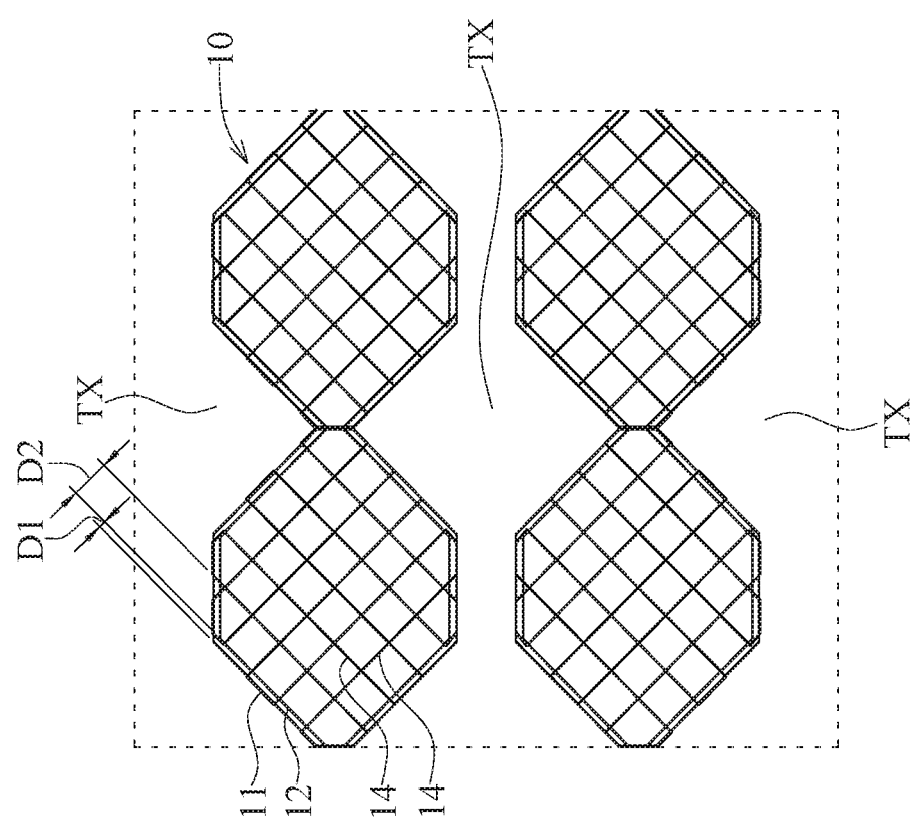
FIG. 5 is a schematic view of the first electrode patterns in a second embodiment of the present disclosure.
Figure 6:
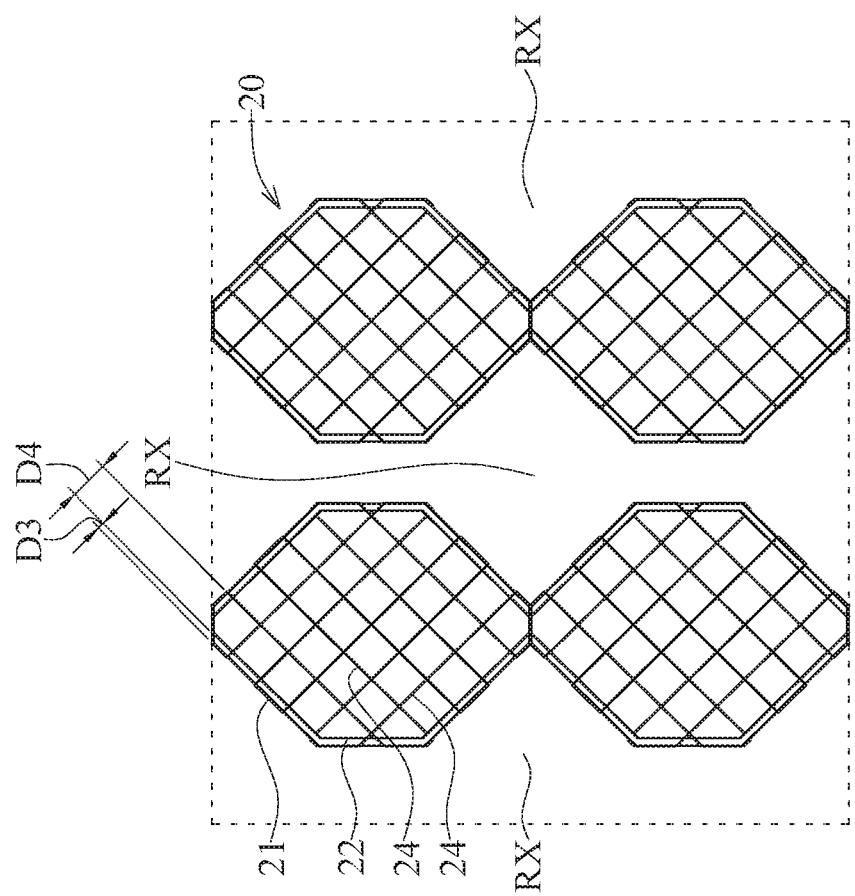
FIG. 6 is a schematic view of the second electrode patterns in the second embodiment of the present disclosure.

References are made to FIG. 5 and FIG. 6. The difference between FIG. 5 and FIG. 3 as well as that between FIG. 6 and FIG. 4 is that the first etching pattern 10 and the second etching pattern 20 have different patterns (i.e., the arrangements and the directions of the inner etching lines are different).

Specifically, as shown in FIG. 5, in the first etching pattern 10, a plurality of first inner etching lines 14 that are perpendicularly interlaced with one another are not arranged in vertical and horizontal directions (i.e., not arranged in the direction toward which the mesh patterns and the second electrode patterns RX of the transparent conductive electrode layer B and not arranged in the direction toward which the mesh patterns and first electrode patterns TX of the transparent conductive electrode layer A extend and extend as shown in FIGS. 2 and 1, respectively). In addition, as shown in FIG. 6, in the second etching pattern 20, a plurality of second inner etching lines 24 that are perpendicularly interlaced with one another are not arranged in vertical and horizontal directions.

Furthermore, a first distance D1 is defined between each of the first outer etching lines 11 and each of the second outer etching lines 12, a second distance D2 is defined between each of the second outer etching lines 12 and each of the first inner etching lines 14 arranged adjacent and parallel thereto, the first distance D1 is less that the second distance D2, and the first distance D1 and the second distance D2 satisfy the equation of $1.5D1 \leq D2 \leq 15D1$. A third distance D3 is defined between each of the third outer etching lines 21 and each of the fourth outer etching lines 22, a fourth distance D4 is defined between each of the fourth outer etching lines 22 and each of the second inner etching lines 24 arranged adjacent and parallel thereto, the third distance D3 is less that the fourth distance D4, and the third distance D3 and the fourth distance D4 satisfy the equation of $1.5D3 \leq D4 \leq 15D3$.

In this embodiment, the first distance D1 and the third distance D3 are between 0.2 mm and 0.6 mm. Preferably, the first distance D1 and the third distance D3 are between 0.3 mm and 0.5 mm.

In this embodiment, the second distance D2 and the fourth distance D4 are between 0.45 mm and 4.5 mm.

In this embodiment, a width of each of the first outer etching lines 11, the second outer etching lines 12, the first inner etching lines 14, the third outer etching lines 21, the fourth outer etching lines 22, and the second inner etching lines 24 is between 25 μm and 65 μm. Preferably, the width of each of the first outer etching lines 11, the second outer etching lines 12, the first inner etching lines 14, the third outer etching lines 21, the fourth outer etching lines 22, and the second inner etching lines 24 is 35±3 μm.

In this embodiment, a visibility of the etching lines is decreased, indicating that the etching lines and the etching patterns are not easily observed by the naked eye. A sheet resistance of each of the first electrode patterns TX and the second electrode patterns RX is 30 ohms per square (Ω/sq), which is suitable for the specification range of touch sensing signals when the present disclosure is applied in medium-small sized panels and large sized panels of touch sensors.

Furthermore, in this embodiment, the etching lines can be manufactured through a photolithography process, a laser ablation process, and/or a laser etching process. Insulation lines that can divide the adjacent transparent conductive electrodes, which are manufactured through the laser ablation process or the laser etching process, can also be configured as the etching lines.

However, it should be noted that the above-mentioned examples are merely one of the possible implementations, and the present disclosure is not limited thereto.

Third Embodiment

Figure 7:
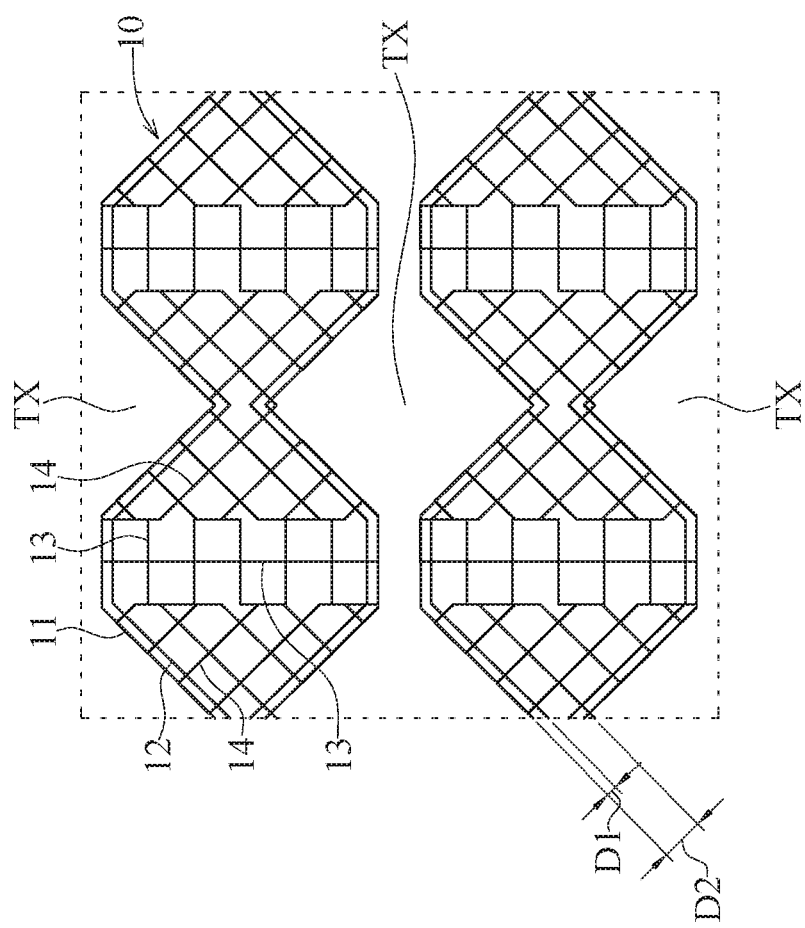
FIG. 7 is a schematic view of the first electrode patterns in a third embodiment of the present disclosure.
Figure 8:
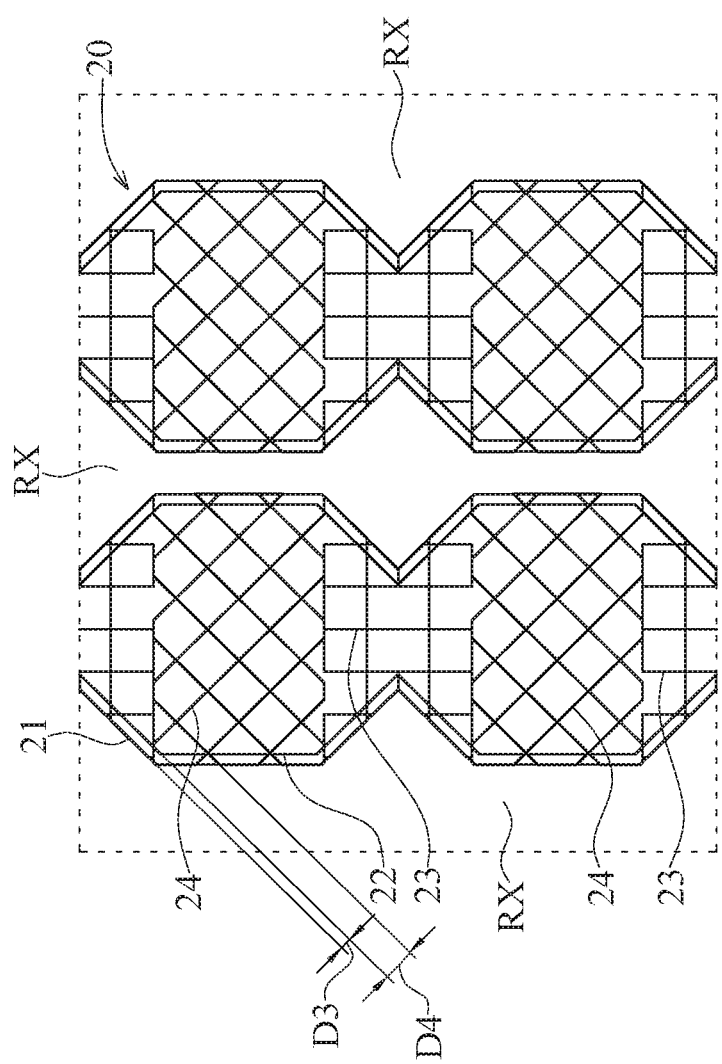
FIG. 8 is a schematic view of the second electrode patterns in the third embodiment of the present disclosure.

References are made to FIG. 7 and FIG. 8. The difference between FIG. 7 and FIG. 3 and FIG. 5 as well as that between FIG. 8 and FIG. 4 and FIG. 6 is that the first etching pattern 10 and the second etching pattern 20 have different patterns (i.e., the arrangements and the directions of the inner etching lines are different).

Specifically, as shown in FIG. 7, in addition to the first inner etching lines 13 that are perpendicularly interlaced with one another, the first etching pattern 10 further includes the first inner etching lines 14 that are also perpendicularly interlaced with one another. It is worth mentioning that the first inner etching lines 13 are perpendicularly interlaced in vertical and horizontal directions, and the first inner etching lines 14 are not perpendicularly interlaced in vertical and horizontal directions. The first inner etching lines 13 and the first inner etching lines 14 are alternatively arranged in the first etching pattern 10 to form a mesh structure.

Specifically, as shown in FIG. 8, in addition to the second inner etching lines 23 that are perpendicularly to one another, the second etching pattern 20 further includes the second inner etching lines 24 that are also perpendicularly interlaced with one another. It is worth mentioning that that the second inner etching lines 23 are perpendicularly interlaced in vertical and horizontal directions, and the second inner etching lines 24 are not perpendicularly interlaced in vertical and horizontal directions. The second inner etching lines 23 and the second inner etching lines 24 are alternatively arranged in the second etching pattern 20 to form a mesh structure.

Furthermore, a first distance D1 is defined between each of the first outer etching lines 11 and each of the second outer etching lines 12, a second distance D2 is defined between each of the second outer etching lines 12 and each of the first inner etching lines 13 and 14 arranged adjacent and parallel thereto, the first distance D1 is less that the second distance D2, and the first distance D1 and the second distance D2 satisfy the equation of $1.5D1 \leq D2 \leq 15D1$. A third distance D3 is defined between each of the third outer etching lines 21 and each of the fourth outer etching lines 22, a fourth distance D4 is defined between the each of fourth outer etching lines 22 and each of the second inner etching lines 23 and 24 arranged adjacent and parallel thereto, the third distance D3 is less that the fourth distance D4, and the third distance D3 and the fourth distance D4 satisfy the equation of $1.5D3 \leq D4 \leq 15D3$.

In this embodiment, the first distance D1 and the third distance D3 are between 0.2 mm and 0.6 mm. Preferably, the first distance D1 and the third distance D3 are between 0.3 mm and 0.5 mm.

In this embodiment, the second distance D2 and the fourth distance D4 are between 0.3 mm and 3.0 mm.

In this embodiment, a width of each of the first outer etching lines 11, the second outer etching lines 12, the first inner etching lines 13 and 14, the third outer etching lines 21, the fourth outer etching lines 22, and the second inner etching lines 23 and 24 is between 25 μm and 65 μm. Preferably, the width of each of the first outer etching lines 11, the second outer etching lines 12, the first inner etching lines 13 and 14, the third outer etching lines 21, the fourth outer etching lines 22, and the second inner etching lines 23 and 24 is 35±3 μm.

In this embodiment, a visibility of the etching lines is decreased, indicating that the etching lines and the etching patterns are not easily observed by the naked eye. A sheet resistance of each of the first electrode patterns TX and the second electrode patterns RX is 30 ohms per square (Ω/sq), which is suitable for the specification range of touch sensing signals when the present disclosure is applied in medium-small sized panels and large sized panels of touch sensors.

Furthermore, in this embodiment, the etching lines can be manufactured through a photolithography process, a laser ablation process, and/or a laser etching process. Insulation lines that can divide the adjacent transparent conductive electrodes, which are manufactured through the laser ablation process or the laser etching process, can also be configured as the etching lines.

However, it should be noted that the above-mentioned examples are merely one of the possible implementations, and the present disclosure is not limited thereto.

Fourth Embodiment

Figure 9:
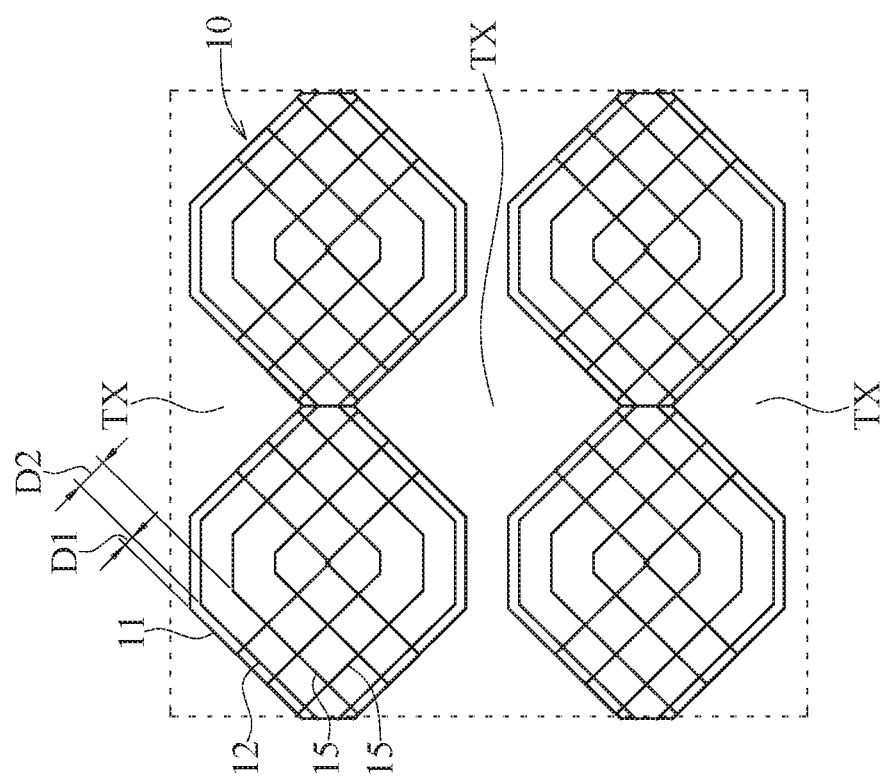
FIG. 9 is a schematic view of the first electrode patterns in a fourth embodiment of the present disclosure.
Figure 10:
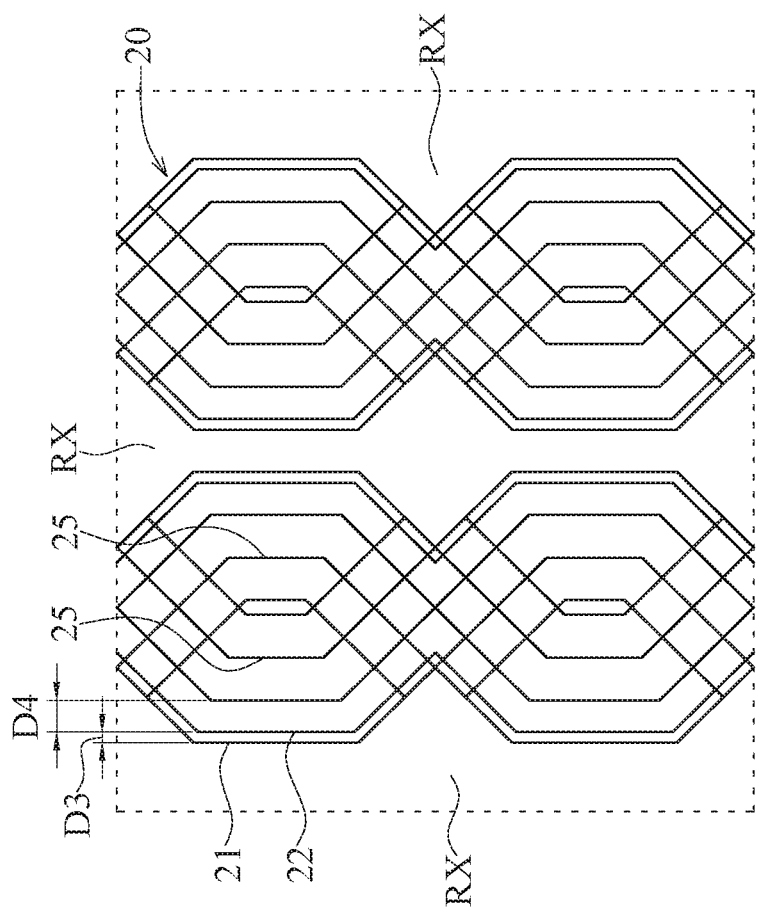
FIG. 10 is a schematic view of the second electrode patterns in the fourth embodiment of the present disclosure.

References are made to FIG. 9 and FIG. 10. The difference between FIG. 9 and FIG. 3, FIG. 5, and FIG. 7 as well as that between FIG. 10 and FIG. 4, FIG. 6, and FIG. 8 is that the first etching pattern 10 and the second etching pattern 20 have different patterns (i.e., the arrangements and the directions of the inner etching lines are different).

Specifically speaking, as shown in FIG. 9, in the first etching pattern 10, a plurality of first inner etching lines 15 are parallel to each of the first outer etching lines 11 and each of the second outer etching lines 12 to form a mesh structure.

Specifically speaking, as shown in FIG. 10, in the second etching pattern 20, a plurality of second inner etching lines 25 are parallel to each of the third outer etching lines 21 and each of the fourth outer etching lines 22 to form a mesh structure.

Furthermore, a first distance D1 is defined between each of the first outer etching lines 11 and each of the second outer etching lines 12, a second distance D2 is defined between each of the second outer etching lines 12 and each of the first inner etching lines 15 arranged adjacent and parallel thereto, the first distance D1 is less that the second distance D2, and the first distance D1 and the second distance D2 satisfy the equation of $1.5D1 \leq D2 \leq 15D1$. A third distance D3 is defined between each of the third outer etching lines 21 and each of the fourth outer etching lines 22, a fourth distance D4 is defined between each of the fourth outer etching lines 22 and each of the second inner etching lines 25 arranged adjacent and parallel thereto, the third distance D3 is less that the fourth distance D4, and the third distance D3 and the fourth distance D4 satisfy the equation of $1.5D3 \leq D4 \leq 15D3$.

In this embodiment, the first distance D1 and the third distance D3 are between 0.2 mm and 0.6 mm. Preferably, the first distance D1 and the third distance D3 are between 0.3 mm and 0.5 mm.

In this embodiment, the second distance D2 and the fourth distance D4 are between 0.3 mm and 3.0 mm.

In this embodiment, a width of each of the first outer etching lines 11, the second outer etching lines 12, the first inner etching lines 15, the third outer etching lines 21, the fourth outer etching lines 22, and the second inner etching lines 25 is between 25 μm and 65 μm. Preferably, the width of each of the first outer etching lines 11, the second outer etching lines 12, the first inner etching lines 15, the third outer etching lines 21, the fourth outer etching lines 22, and the second inner etching lines 25 is 35±3 μm.

In this embodiment, a visibility of the etching lines is decreased, indicating that the etching lines and the etching patterns are not easily observed by the naked eye. A sheet resistance of each of the first electrode patterns TX and the second electrode patterns RX is 30 ohms per square (Ω/sq), which is suitable for the specification range of touch sensing signals when the present disclosure is applied in medium-small sized panels and large sized panels of touch sensors.

Furthermore, in this embodiment, the etching lines can be manufactured through a photolithography process, a laser ablation process, and/or a laser etching process. Insulation lines that can divide the adjacent transparent conductive electrodes, which are manufactured through the laser ablation process or the laser etching process, can also be configured as the etching lines.

However, it should be noted that the above-mentioned examples are merely each of the possible implementations, and the present disclosure is not limited thereto.

Fifth Embodiment

Figure 11:
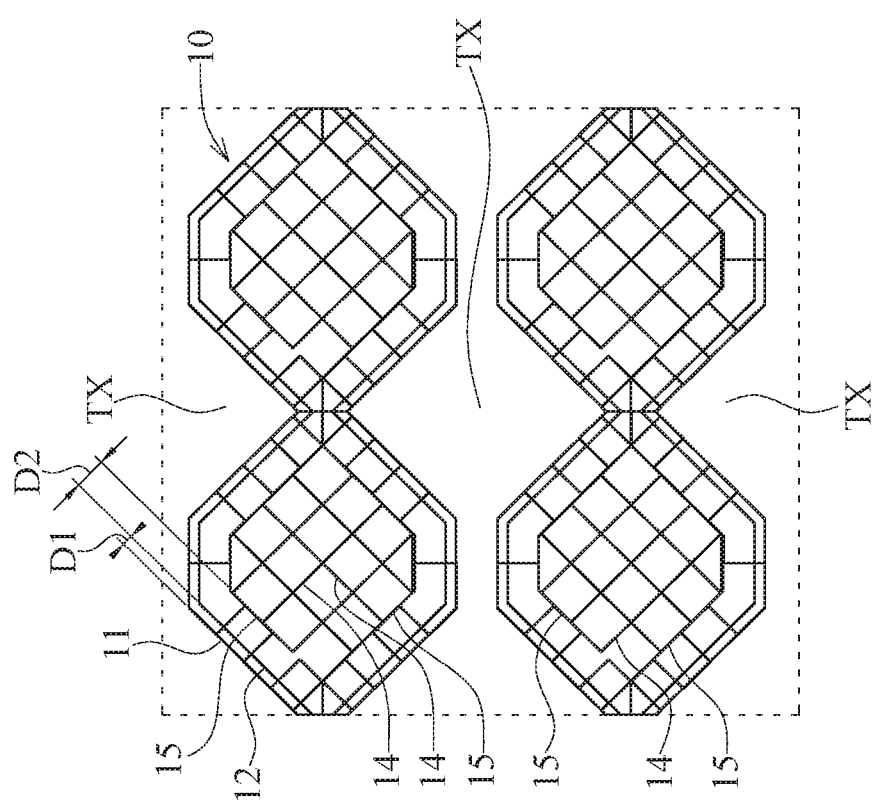
FIG. 11 is a schematic view of the first electrode patterns in a fifth embodiment of the present disclosure.
Figure 12:
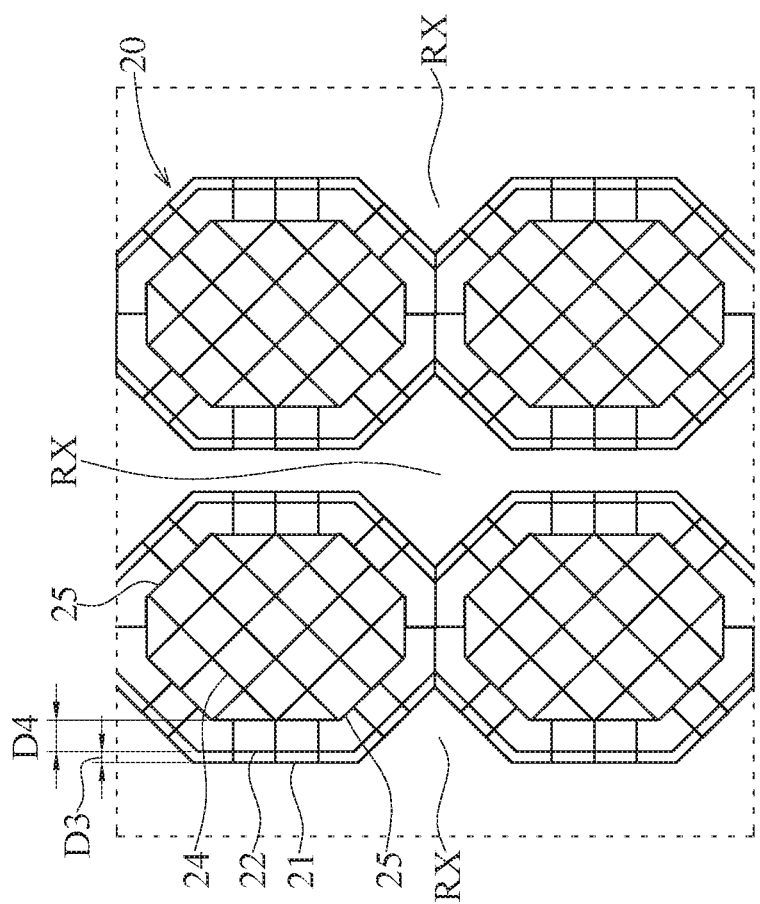
FIG. 12 is a schematic view of the second electrode patterns in the fifth embodiment of the present disclosure.

References are made to FIG. 11 and FIG. 12. The difference between FIG. 11 and FIG. 3, FIG. 5, FIG. 7, and FIG. 9 as well as that between FIG. 12 and FIG. 4, FIG. 6, FIG. 8, and FIG. 10 is that the first etching pattern 10 and the second etching pattern 20 have different patterns (i.e., the arrangements and the directions of the inner etching lines are different). A part of the first inner etching lines 14 and 15 are parallel to each of the first outer etching lines 11 and each of the second outer etching lines 12, and another part of the first inner etching lines 14 and 15 are perpendicularly interlaced with one another, so as to form a mesh structure. A part of the second inner etching lines 24 and 25 are parallel to each of the third outer etching lines 21 and each of the fourth outer etching lines 22, and another part of the second inner etching lines 24 and 25 are perpendicularly interlaced with one another, so as to form a mesh structure.

Specifically, as shown in FIG. 11, in addition to the first inner etching lines 14 that are perpendicularly interlaced with one another (not in vertical and horizontal directions), the first etching pattern 10 further includes two of the first inner etching lines 15 that are parallel to each of the first outer etching lines 11 and each of the second outer etching lines 12, so as to form a mesh structure.

Specifically, as shown in FIG. 12, in addition to the second inner etching lines 24 that are perpendicularly interlaced with one another (not in vertical and horizontal directions), the second etching pattern 20 further includes two of the second inner etching lines 25 that are parallel to each of the third outer etching lines 21 and each of the fourth outer etching lines 22, so as to form a mesh structure.

Furthermore, a first distance D1 is defined between each of the first outer etching lines 11 and each of the second outer etching lines 12, a second distance D2 is defined between each of the second outer etching lines 12 and each of the first inner etching lines 15 arranged adjacent and parallel thereto, the first distance D1 is less that the second distance D2, and the first distance D1 and the second distance D2 satisfy the equation of $1.5D1 \leq D2 \leq 15D1$. A third distance D3 is defined between each of the third outer etching lines 21 and each of the fourth outer etching lines 22, a fourth distance D4 is defined between each of the fourth outer etching lines 22 and each of the second inner etching lines 25 arranged adjacent and parallel thereto, the third distance D3 is less that the fourth distance D4, and the third distance D3 and the fourth distance D4 satisfy the equation of $1.5D3 \leq D4 \leq 15D3$.

In this embodiment, the first distance D1 and the third distance D3 are between 0.2 mm and 0.6 mm. Preferably, the first distance D1 and the third distance D3 are between 0.3 mm and 0.5 mm.

In this embodiment, the second distance D2 and the fourth distance D4 are between 0.3 mm and 3.0 mm.

In this embodiment, a width of each of the first outer etching lines 11, the second outer etching lines 12, the first inner etching lines 14 and 15, the third outer etching lines 21, the fourth outer etching lines 22, and the second inner etching lines 24 and 25 is between 25 μm and 65 μm. Preferably, the width of each of the first outer etching lines 11, the second outer etching lines 12, the first inner etching lines 14 and 15, the third outer etching lines 21, the fourth outer etching lines 22, and the second inner etching lines 24 and 25 is 35±3 μm.

In this embodiment, a visibility of the etching lines is decreased, indicating that the etching lines and the etching patterns are not easily observed by the naked eye. A sheet resistance of each of the first electrode patterns TX and the second electrode patterns RX is 30 ohms per square (Ω/sq), which is suitable for the specification range of touch sensing signals when the present disclosure is applied in medium-small sized panels and large sized panels of touch sensors.

Furthermore, in this embodiment, the etching lines can be manufactured through a photolithography process, a laser ablation process, and/or a laser etching process. Insulation lines that can divide the adjacent transparent conductive electrodes, which are manufactured through the laser ablation process or the laser etching process, can also be configured as the etching lines.

However, it should be noted that the above-mentioned examples are merely one of the possible implementations, and the present disclosure is not limited thereto.

Sixth Embodiment

Figure 13:
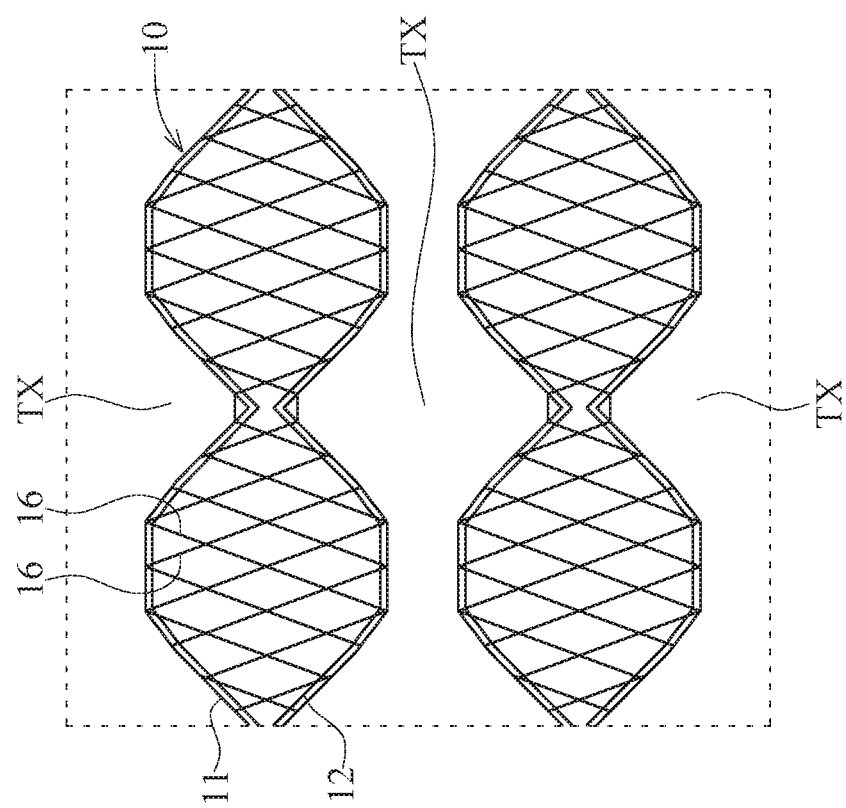
FIG. 13 is a schematic view of the first electrode patterns in a sixth embodiment of the present disclosure.
Figure 14:
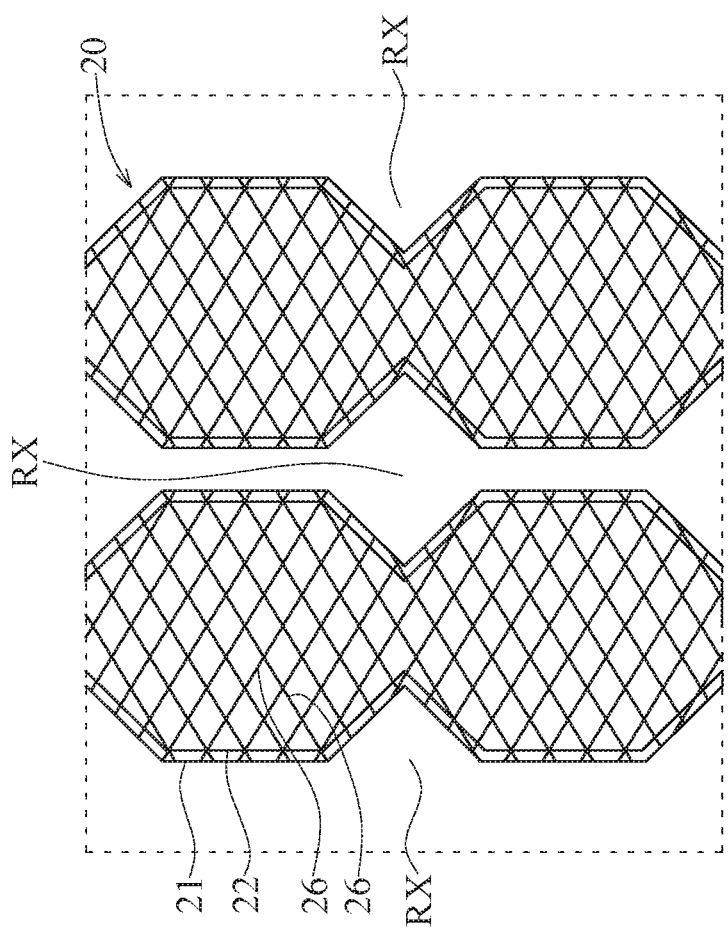
FIG. 14 is a schematic view of the second electrode patterns in the sixth embodiment of the present disclosure.

References are made to FIG. 13 and FIG. 14. The difference between FIG. 13 and FIG. 3, FIG. 5, FIG. 7, FIG. 9, and FIG. 11 as well as that between FIG. 14 and FIG. 4, FIG. 6, FIG. 8, FIG. 10, and FIG. 12 is that the first etching pattern 10 and the second etching pattern 20 have different patterns (i.e., the arrangements and the directions of the inner etching lines are different). The first inner etching lines are interlaced with one another to form a mesh structure, and the second inner etching lines are also interlaced with one another to form a mesh structure.

Specifically, as shown in FIG. 13, in the first etching pattern 10, a plurality of first inner etching lines 16 are interlaced with one another to form a mesh structure. It is worth mentioning that, in this embodiment, the first inner etching lines 16 are not interlaced perpendicularly with one another.

Specifically, as shown in FIG. 14, in the second etching pattern 20, a plurality of second inner etching lines 26 are interlaced with one another to form a mesh structure. It is worth mentioning that, in this embodiment, the first inner etching lines 16 are not interlaced perpendicularly with one another.

Furthermore, a distance between each of the first outer etching lines 11 and each of the second outer etching lines 12 is less than a distance between any two of the first inner etching lines 16, and a distance between each of the third outer etching lines 21 and each of the fourth outer etching lines 22 is less than a distance between any two of the second inner etching lines 26.

In this embodiment, a visibility of the etching lines is decreased, indicating that the etching lines and the etching patterns are not easily observed by the naked eye. A sheet resistance of each of the first electrode patterns TX and the second electrode patterns RX is 30 ohms per square (Ω/sq), which is suitable for the specification range of touch sensing signals when the present disclosure is applied in medium-small sized panels and large sized panels of touch sensors.

Furthermore, in this embodiment, the etching lines can be manufactured through a photolithography process, a laser ablation process, and/or a laser etching process. Insulation lines that can divide the adjacent transparent conductive electrodes, which are manufactured through the laser ablation process or the laser etching process, can also be configured as the etching lines.

One of the advantages of the present disclosure is that the transparent conductive electrodes of the touch panel can have an increased conductivity and a decreased visibility through the technical solution of: 1) an edge of each of the first electrode patterns TX having a first outer etching line 11 and a second outer etching line 12 that are parallel to each other, and a plurality of first inner etching lines 13, 14, and 15 disposed between any two of the adjacent first electrode patterns TX", 2) a first distance D1 being defined between each of the first outer etching lines 11 and each of the second outer etching lines 12, and a second distance D2 being defined between each of the second outer etching lines 12 and each of the first inner etching lines 13, 14, and 15 that is parallel and adjacent thereto, and 3) the first distance D1 being less than the second distance D2, and the first distance D1 and the second distance D2 satisfying the equation of $1.5D1 \leq D2 \leq 15D1$.

Another one of the advantages of the present disclosure is that the transparent conductive electrodes of the touch panel can have an increased conductivity and a decreased visibility through the technical solution of: 1) an edge of each of the first electrode patterns TX having a first outer etching line 11 and a second outer etching line 12 that are parallel to each other, 2) a plurality of first inner etching lines 16 disposed between two of the adjacent first electrode patterns TX, and 3) a distance between each of the first outer etching lines 11 and each of the second outer etching lines 12 is less than a distance between any two of the first inner etching lines 16.

Furthermore, an edge of conventional transparent conductive electrodes has only a single etching line (i.e., groove). In order to prevent the conductive material of the adjacent transparent conductive electrodes from contacting one another and causing a short circuit, the etching line has to be widened and deepened. However, the widened and deepened etching line is more visible to the naked eye. Therefore, the single etching line on an edge of a conventional electrode pattern is increased to two etching lines on each of the edges of the electrode patterns of the present disclosure, which are the first outer etching line 11 and the second outer etching line 12. The two outer etching lines are not required to be purposefully widened and deepened to prevent the conductive material of the adjacent transparent conductive electrodes from contacting one another through the aforementioned structural design.

In addition, although the two outer etching lines of the present disclosure have improved the problem of having only a single outer etching line, when the two outer etching lines are too close to each other, the contours of the transparent conductive electrodes will still be relatively visible. Therefore, the distance between the two outer etching lines of the transparent conductive electrodes of the present disclosure is further adjusted (between 0.2 mm and 0.6 mm, preferably 0.3 mm), such that transparency of the contours of the transparent conductive electrodes can be optimized, that is, minimizing a visibility of the two outer etching lines, such that the transparent conductive electrodes have an increased conductivity without easily having a short circuit, and also a minimized visibility.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. Transparent conductive electrodes of a touch panel, comprising:
a plurality of first electrode patterns, wherein an edge of each of the first electrode patterns has a first outer etching line and a second outer etching line that are parallel to each other, and wherein a plurality of first inner etching lines are disposed between any two adjacent first electrode patterns of the first electrode patterns;

wherein a first distance is defined between each of the first outer etching lines and each of the second outer etching lines, a second distance is defined between each of the second outer etching lines and each of the first inner etching lines that is parallel and adjacent thereto, the second distance is greater than or equal to 1.5 times the first distance, and the second distance is less than or equal to 15 times the first distance.

2. The transparent conductive electrodes according to claim 1, wherein the first distance is between 0.2 mm and 0.6 mm.

3. The transparent conductive electrodes according to claim 1, wherein the second distance is between 0.3 mm and 3.0 mm.

4. The transparent conductive electrodes according to claim 1, wherein a width of each of the first outer etching lines, the second outer etching lines, and the first inner etching lines is between 25 µm and 65 µm.

5. The transparent conductive electrodes according to claim 1, wherein the first inner etching lines are perpendicularly interlaced with one another to define a mesh structure.

6. The transparent conductive electrodes according to claim 1, wherein each of the first electrode patterns extends in a first direction, and the first inner etching lines are perpendicularly interlaced with one another in the first direction and in a second direction perpendicular to the first direction to define a mesh structure.

7. The transparent conductive electrodes according to claim 1, wherein the first inner etching lines are parallel to the first outer etching lines and the second outer etching lines to define a mesh structure.

8. The transparent conductive electrodes according to claim 1, wherein a part of the first inner etching lines are parallel to the first outer etching lines and the second outer etching lines, and another part of the first inner etching lines are perpendicularly interlaced with one another, so as to define a mesh structure.

\* \* \* \* \*